United States Patent
Tanaka et al.

(10) Patent No.: US 10,136,076 B2
(45) Date of Patent: Nov. 20, 2018

(54) IMAGING DEVICE, IMAGING SYSTEM, AND IMAGING METHOD

(71) Applicant: PANASONIC INTELLECTUAL PROPERTY MANAGEMENT CO., LTD., Osaka (JP)

(72) Inventors: Shogo Tanaka, Saga (JP); Kenji Tabei, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 258 days.

(21) Appl. No.: 15/072,690

(22) Filed: Mar. 17, 2016

(65) Prior Publication Data
US 2016/0198103 A1 Jul. 7, 2016

Related U.S. Application Data

(63) Continuation-in-part of application No. PCT/JP2015/002508, filed on May 19, 2015.

(30) Foreign Application Priority Data

May 23, 2014 (JP) .................. 2014-107297

(51) Int. Cl.
*H04N 5/33* (2006.01)
*H04N 5/235* (2006.01)
(Continued)

(52) U.S. Cl.
CPC .............. *H04N 5/332* (2013.01); *G03B 15/02* (2013.01); *G03B 15/05* (2013.01); *H04N 5/2351* (2013.01);
(Continued)

(58) Field of Classification Search
CPC .................. G03B 15/02; G03B 15/05; G03B 2215/0567; G03B 2215/0575;
(Continued)

(56) References Cited

U.S. PATENT DOCUMENTS 9,354,490 B2 * 5/2016 Fergus .................. G03B 15/03
9,939,712 B2 * 4/2018 Furuta .................. G03B 7/093
(Continued)

FOREIGN PATENT DOCUMENTS

JP 2009-066121 4/2009
JP 2009-117976 5/2009
(Continued)

OTHER PUBLICATIONS

Matsui et al., "Image Enhancement of Low-Light Scenes with Near-Infrared Flash Images", Proc. Asian Conference on Computer Vision (ACCV2009), Sep. 2009, pp. 213-223.
(Continued)

*Primary Examiner* — William C Vaughn, Jr.
*Assistant Examiner* — Naod W Belai
(74) *Attorney, Agent, or Firm* — Greenblum & Bernstein, P.L.C.

(57) ABSTRACT

An imaging device is provided with a condition designating unit which designates, by time division, imaging conditions for capturing an image, and light emission conditions for emitting auxiliary light, an imaging section which captures an image including a subject according to the imaging conditions, a light emitting unit which emits auxiliary light with respect to the subject according to the light emission conditions, and an image composer which composes a first image that is captured under a first imaging condition during a light emission period in which the auxiliary light is emitted and a second image which is captured under a second imaging condition during a non-light-emission period which
(Continued)

is continuous to the light emission period and in which the auxiliary light is not emitted, in which quality of an image which is captured in a low illumination environment is improved.

4 Claims, 13 Drawing Sheets

(51) Int. Cl.
  *G03B 15/02*  (2006.01)
  *G03B 15/05*  (2006.01)
  *H04N 5/232*  (2006.01)
  *H04N 9/04*  (2006.01)
  *G03B 7/28*  (2006.01)

(52) U.S. Cl.
  CPC .......... *H04N 5/2352* (2013.01); *H04N 5/2354* (2013.01); *H04N 5/23245* (2013.01); *H04N 9/045* (2013.01); *G03B 7/28* (2013.01); *G03B 2215/0567* (2013.01); *G03B 2215/0575* (2013.01); *G03B 2215/0596* (2013.01)

(58) Field of Classification Search
  CPC .............. G03B 2215/0596; G03B 7/28; H04N 5/23245; H04N 5/2351; H04N 5/2352; H04N 5/2354; H04N 5/332; H04N 9/045
  USPC ........................................................ 348/164
  See application file for complete search history.

(56) References Cited

U.S. PATENT DOCUMENTS

| | | | |
|---|---|---|---|
| 2004/0071458 A1* | 4/2004 | Motomura | G03B 15/05 396/159 |
| 2006/0114333 A1* | 6/2006 | Gokturk | G01S 7/487 348/222.1 |
| 2009/0065679 A1 | 3/2009 | Tanimoto | |
| 2011/0228096 A1* | 9/2011 | Friel | H04N 5/33 348/164 |
| 2013/0002882 A1* | 1/2013 | Onozawa | H04N 5/2353 348/164 |
| 2013/0222584 A1* | 8/2013 | Aoki | H04N 5/335 348/143 |
| 2013/0222642 A1* | 8/2013 | Watanabe | H04N 5/2354 348/234 |
| 2013/0230294 A1 | 9/2013 | Sassa et al. | |
| 2013/0258112 A1* | 10/2013 | Baksht | H04N 5/04 348/164 |
| 2015/0163418 A1* | 6/2015 | Chen | H04N 5/332 348/164 |

FOREIGN PATENT DOCUMENTS

| | | |
|---|---|---|
| JP | 2011-233983 | 11/2011 |
| JP | 2012-065312 | 3/2012 |
| JP | 2012-095143 | 5/2012 |

OTHER PUBLICATIONS

International Search Report in PCT/JP2015/002508, dated Jul. 21, 2015.

\* cited by examiner

FIG. 11

| IMAGING SCENE | SLIGHTLY DARK, CLOSE SUBJECT | DARK PLACE, DISTANT SUBJECT |
|---|---|---|
| PWM CONTROL OF IR ILLUMINATION | DUTY SMALL | DUTY LARGE |
| IMAGING PARAMETERS | IR IMAGE IMAGING PARAMETER A / RGB IMAGE IMAGING PARAMETER B | IR IMAGE IMAGING PARAMETER C / RGB IMAGE IMAGING PARAMETER D |

IMAGING DEVICE, IMAGING SYSTEM, AND IMAGING METHOD

This is a Continuation-In-Part of International Application No. PCT/JP2015/002508, filed May 19, 2015, the contents of which are expressly incorporated by reference herein in its entirety.

BACKGROUND OF THE INVENTION

1. Field of the Invention

The present disclosure relates to an imaging device, an imaging system, and an imaging method in which an image is captured.

2. Description of the Related Art

In for example, "Sosuke Matsui, Miho Shimano, Takahiro Okabe, and Yoichi Sato, "Image Enhancement of Low-Light Scenes with Near-Infrared Flash Images," in Proc. Asian Conference on Computer Vision (ACCV2009), p. 213-223, September 2009", an imaging system is known which is provided with a color camera which captures a color (RGB: red green blue) image, a near infrared (NIR) camera which captures an NIR image, and a half mirror. In the imaging system, when a color image is captured, a flash in which a near infrared (NIR) beam is radiated on a subject is not used, and in a case where the NIR image is captured, the flashing is used.

In the imaging system, light from the subject is divided in two directions by a half mirror. The light which is divided in two directions is captured using the color camera and the NIR camera, and an RGB image and an NIR image are obtained. The RGB image is a color image. The NIR image is one image which is captured by radiating the near infrared (NIR) beam, and is a black and white image.

The imaging system has an image composing technique which composes the RGB image and the NIR image, and obtains a composed image in which color tone is added to the black and white image.

SUMMARY OF THE INVENTION

The present disclosure easily improves quality of an image which is captured in a low illumination environment without a large-scale system for obtaining the composed image being necessary.

An imaging device of the present disclosure is provided with a condition designating unit which designates, by time division, imaging conditions for capturing an image, and light emission conditions for emitting auxiliary light, an imaging section which captures an image including a subject according to the imaging conditions, a light emitting unit which emits the auxiliary light with respect to the subject according to the light emission conditions, and an image composer which composes a first image that is captured under a first imaging condition during a light emission period in which the auxiliary light is emitted and a second image which is captured under a second imaging condition during a non-light-emission period which is continuous to the light emission period and in which the auxiliary light is not emitted.

An imaging system of the present disclosure is an imaging system provided with an imaging device and an information processing device, in which the imaging device is provided with a condition designating unit which designates, by time division, imaging conditions for capturing an image, and light emission conditions for emitting auxiliary light, an imaging section which captures a first image and a second image including a subject according to the imaging conditions, a light emitting unit which emits the auxiliary light with respect to the subject according to the light emission conditions, and a transmission unit which transmits the captured first image and second image, the imaging section captures the first image under a first imaging condition during a light emission period in which the auxiliary light is emitted, and captures the second image under a second imaging condition during a non-light-emission period which is continuous to the light emission period and in which the auxiliary light is not emitted, and the information processing device is provided with a receiving unit which receives the first image and the second image from the imaging device, and an image composer which composes the first image and the second image.

An imaging method of the present disclosure is an imaging method in the imaging device, including designating, by time division, imaging conditions for capturing an image including a subject, and light emission conditions for emitting auxiliary light with respect to the subject, capturing a first image under a first imaging condition during a light emission period in which the auxiliary light is emitted, capturing a second image under a second imaging condition during a non-light-emission period which is continuous to the light emission period and in which the auxiliary light is not emitted, and composing the first image and the second image.

According to the present disclosure, it is possible to easily improve quality of the image which is captured in a low illumination environment without a large-scale system for obtaining the composed image being necessary.

BRIEF DESCRIPTION OF DRAWINGS

FIG. 11 is a schematic diagram illustrating an example of PWM control and imaging parameters of IR radiation in each imaging scene of the embodiment;

DETAILED DESCRIPTION OF THE PREFERRED EMBODIMENT

An embodiment of the present disclosure will be described below with reference to the drawings.

In a case where it is bright around the daytime and the like, an ordinary surveillance camera acquires a color image in a day mode, and in a case where it is dark around nighttime and the like, acquires a black and white image in a night mode.

In the day mode, the surveillance camera cuts off an infrared region using an infrared (IR) cutoff filter, and compensates color imaging color reproducibility by carrying out color-tone correction. Meanwhile, in the night mode, the surveillance camera captures an image by being used up to the infrared region and achieves high sensitivity without using the IR-cutoff filter. For this reason, in the night mode, color reproducibility is reduced more than in the day mode, and a black and white image is captured and not a color image.

Although a surveillance camera exists which radiates infrared light onto a subject using light emitting diode (LED) illumination or the like, in the surveillance camera, for the same reason as described above, color reproducibility is insufficient. For this reason, the image which is obtained using the surveillance camera is also a black and white image.

In recent years, even in a low illumination environment such as during the night from the point of view of security, demand to capture color images is increased.

The imaging system that is used in which two cameras and a half mirror are disposed on a laboratory table has an image composing technique which composes the RGB image and the NIR image, and is a large-scale system which is used in an investigation of the image composing technique at a laboratory level. For this reason, it is difficult for such an imaging system to be commercialized as one imaging device. In addition, costs are necessary in order to prepare the imaging system, and adjustment and maintenance of the imaging system is difficult.

The imaging device, the imaging system, and the imaging method will be described below in which it is possible to easily improve quality of the image which is captured in the low illumination environment without a large-scale system for obtaining the composed image being necessary.

For example, the imaging device of the embodiment below is applied to the surveillance camera.

Exemplary Embodiment

Figure 1:
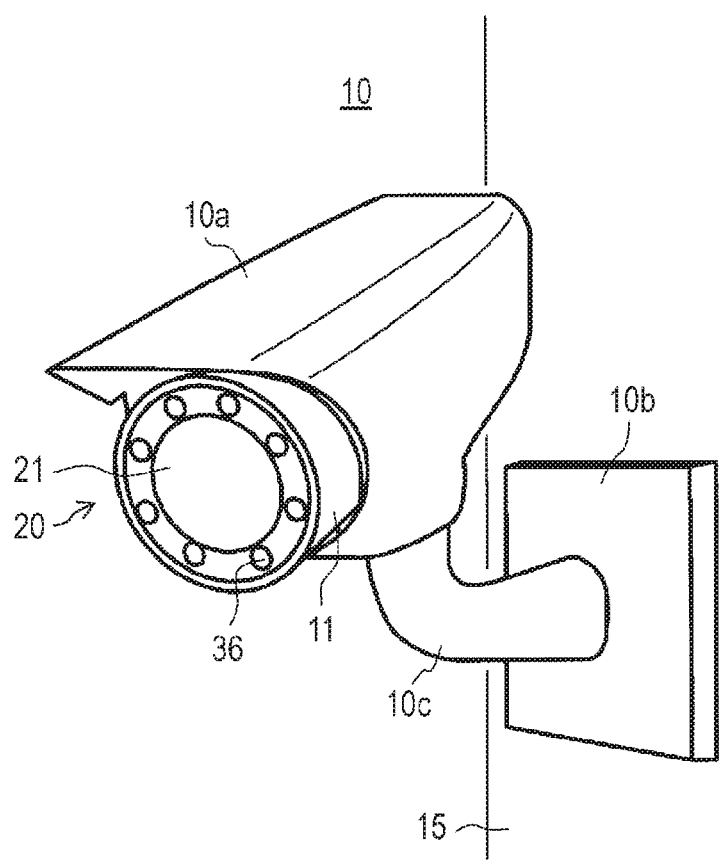
FIG. 1 is a schematic diagram illustrating an appearance example of a surveillance camera in an embodiment.

FIG. 1 is a schematic diagram illustrating an appearance example of surveillance camera 10 in an embodiment.

Surveillance camera 10 has chassis 10a, and is fixed on wall surface 15 using arm 10c and attaching portion 10b which are linked to chassis 10a. Imaging section 20 is accommodated in lens barrel 11 which is in front of chassis 10a.

Imaging section 20 has lens 21 on a front surface, and is oriented so as to capture a predetermined region which includes the subject. In addition, IR-LED 36 which radiates IR light is provided on lens barrel 11 adjacent to imaging section 20. In FIG. 1, providing eight IR-LED 36 is exemplified, but the number of IR-LED 36 is not limited thereto.

Figure 2:
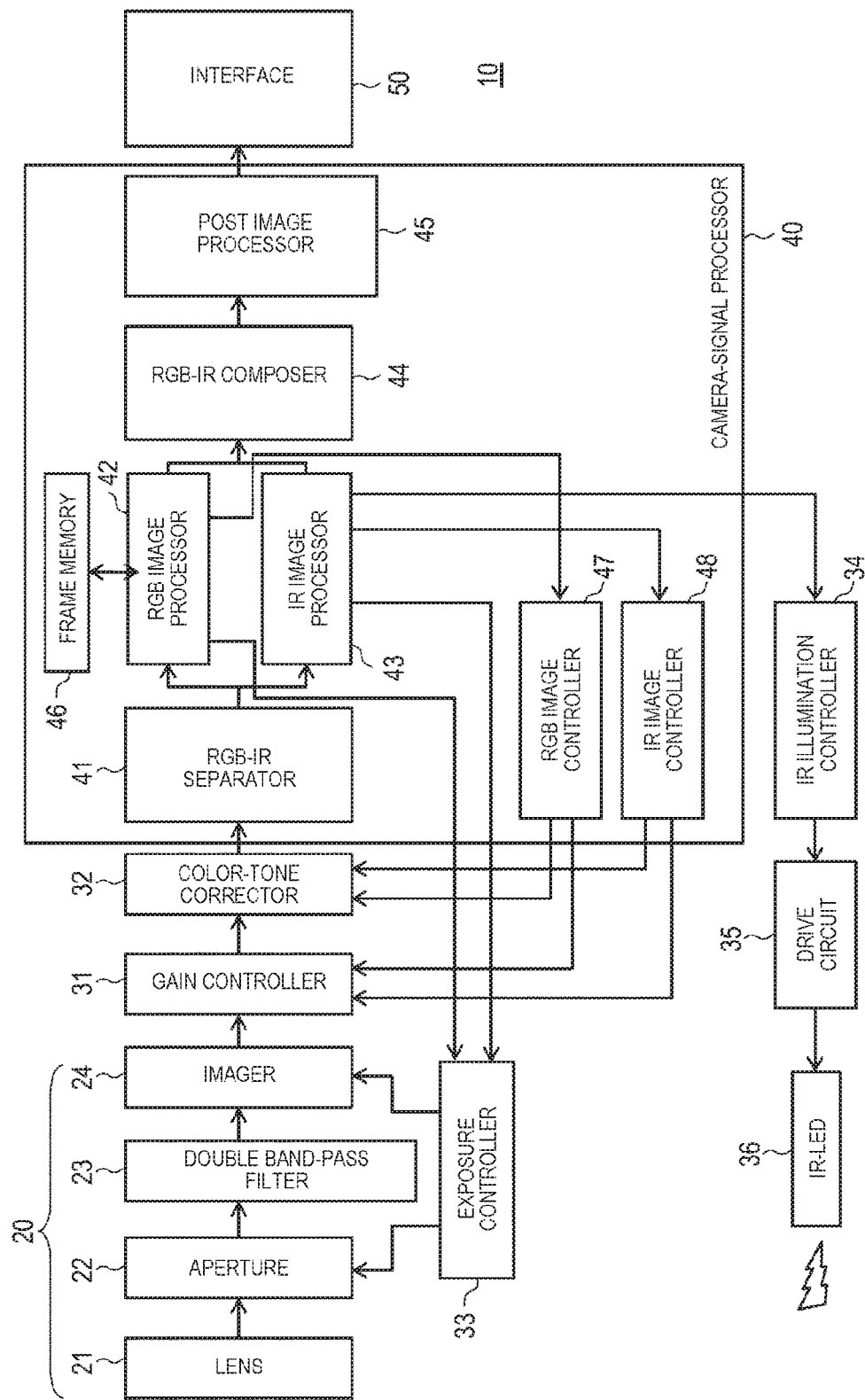
FIG. 2 is a block diagram illustrating a configuration example of a surveillance camera in the embodiment.

FIG. 2 is a block diagram illustrating a configuration example of surveillance camera 10.

Surveillance camera 10 has imaging section 20. Imaging section 20 includes lens 21, aperture 22, double band-pass filter 23, and imager 24. Lens 21, aperture 22, double band-pass filter 23, and imager 24 are respectively disposed in order along an optical axial direction. Lens 21 is positioned in front of imaging section 20, and imager 24 is positioned behind imaging section 20. Imaging section 20 captures the image which includes the subject according to imaging conditions for capturing the image.

Lens 21 condenses light which is incident to imaging section 20. Aperture 22 adjusts the amount of light which is incident through lens 21 according to an instruction from exposure controller 33.

Double (dual) band-pass filter 23 is a filter which is disposed in front of imager 24, and is designed such that transmissivity of light that has a wavelength of a visible light region and the infrared region is high and transmissivity of light which has another wavelength is low.

Imager 24 includes a color-image sensor in which color filter 25 is incorporated on the front surface. For example, imager 24 includes a charge coupled device (CCD) sensor and a complementary metal-oxide semiconductor (CMOS) sensor.

Imager 24 receives light from the subject via double band-pass filter 23 and color filter 25, and the image is obtained by converting to an electrical signal. For example, imager 24 obtains, by time division (periodically), an image in which the IR component is comparatively great (IR image) and an image in which the IR component is relatively slight (RGB image). Imager 24 may control an amount of exposure or an exposure time by imager 24 itself using a known method according to an instruction from exposure controller 33.

Surveillance camera 10 has gain controller 31, color-tone corrector 32, exposure controller 33, and camera-signal processor 40.

Gain controller 31 controls gain of an amplifier (not illustrated) such that a signal level of an image which is output from imager 24 is amplified at a gain which is designated by RGB image controller 47 or IR image controller 48. Gain of the amplifier is simply referred to below as gain.

Color-tone corrector 32 corrects color tone of the image which is output from imager 24 at an amount of correction which is designated by RGB image controller 47 or IR image controller 48. For example, the color tone includes white balance.

Exposure controller 33 controls an aperture value of aperture 22, and controls the exposure time of imager 24.

Camera-signal processor 40 executes various signal processes with respect to an image signal. Camera-signal processor 40 has RGB-IR separator 41, RGB image processor 42, IR image processor 43, RGB-IR composer 44, post image processor 45, frame memory 46, RGB image controller 47, and IR image controller 48.

For example, RGB-IR separator 41 separates an RGB image and an IR image by obtaining the RGB image and the IR image, by time division, from color-tone corrector 32 via the same signal line. RGB-IR separator 41 outputs the RGB image to RGB image processor 42, and outputs the IR image to IR image processor 43.

RGB image processor 42 executes a predetermined image process with respect to the separated RGB image, and outputs to RGB-IR composer 44. For example, the image processes by RGB image processor 42 includes gradation correction, color tone correction, and noise removal with respect to the RGB image.

For example, RGB image processor 42 instructs imaging conditions (imaging parameters) which are appropriate to imaging of the RGB image with respect to RGB image controller 47. For example, the imaging parameters include gain and an amount of correction of color-tone correction. For example, RGB image processor 42 instructs imaging conditions (for example, exposure time) which are appropriate to imaging of the RGB image with respect to exposure controller 33.

For example, the imaging parameters include gain, exposure time, amount of exposure, amount of color-tone correction (for example, amount of adjustment of white balance), and amount of gradation correction. For example, information on the imaging parameters is held in a memory (not illustrated) within surveillance camera 10. The imaging parameter for RGB image capturing and the imaging parameter for IR image capturing as imaging parameters may be independently provided.

RGB image processor 42 may update the imaging parameters according to a difference in a case where there is a difference between a first RGB image component and a second RGB image component. The first RGB image component is an RGB image component which is inferred when obtained by instructing imaging parameters with respect to exposure controller 33 and RGB image controller 47. The second RGB image component is an RGB image component which is actually acquired from RGB-IR separator 41. The updated imaging parameters may be sent to RGB image controller 47 and exposure controller 33. RGB image processor 42 may carry out image processing (for example, gradation correction and color-tone correction) according to the difference.

In addition, RGB image processor 42 may carry out image processing (for example, gradation correction and color-tone correction) in a case where an operation for performing a specified image process is received from a user by an operator (not illustrated).

RGB image processor 42 is an example of a condition designating unit which designates, by time division, imaging conditions and light emission conditions.

For example, RGB image controller 47 performs an instruction which controls gain (for example, an increase in gain) with respect to gain controller 31 accompanying an instructed imaging parameter, and performs an instruction which corrects color tone with respect to color-tone corrector 32.

IR image processor 43 executes a predetermined image process with respect to the separated IR image, and outputs to RGB-IR composer 44. For example, the image process by IR image processor 43 includes gradation correction, color tone correction, and noise removal with respect to the IR image.

For example, IR image processor 43 instructs imaging conditions (imaging parameters) which are appropriate to imaging of the IR image with respect to IR image controller 48. For example, the imaging parameters include gain and an amount of correction of color-tone correction. For example, IR image processor 43 instructs imaging conditions (for example, exposure time) which are appropriate to imaging of the IR image with respect to exposure controller 33. For example, IR image processor 43 instructs light-emission conditions which are appropriate to imaging of the IR image with respect to IR radiation controller 34. IR light is infrared light, and NIR light includes near-infrared light (NIR light).

The light-emission conditions include information on presence or absence of light emission of the IR light and amount of light-emission of the IR light using IR-LED 36. For example, the information of the light-emission conditions are held in a memory (not illustrated) within camera-signal processor 40 of surveillance camera 10.

IR image processor 43 may update at least one of imaging parameters and light-emission conditions according to a difference in a case where there is a difference between a first IR image component and a second IR image component. The first IR image component is an IR image component which is inferred to be obtained using imaging parameters that are instructed with respect to exposure controller 33 and IR image controller 48 and light-emission conditions that are instructed with respect to IR radiation controller 34. The second IR image component is an IR image component which is actually acquired from RGB-IR separator 41. The updated imaging parameters may be sent to IR image controller 48 and exposure controller 33. The updated light-emission condition may be sent to IR radiation controller 34. IR image processor 43 may carry out image processing (for example, gradation correction and color-tone correction) according to the difference.

In addition, IR image processor 43 may carry out image processing (for example, gradation correction and color-tone correction) in a case where an operation for performing a specified image process is received from a user by an operator (not illustrated).

IR image processor 43 is an example of a condition designating unit which designates, by time division, imaging conditions and light emission conditions.

For example, IR image controller 48 performs an instruction which controls gain (for example, reduces gain) with respect to gain controller 31 accompanying an instructed imaging parameter, and performs an instruction which corrects color tone with respect to color-tone corrector 32.

For example, at a predetermined timing, the RGB-IR composer 44 composes the RGB image and the IR image and generates a composed image using a known image composing method which is described in Non-Patent Literature 1. For example, RGB-IR composer 44 extracts a color tone component from the RGB image, extracts an edge component and a gradation component from the IR image, and the composed image is generated based on each extracted component. Even in the low illumination environment, it is possible to generate a vivid color image where contours are sharp using RGB-IR composer 44. RGB-IR composer 44 is an example of the image composer.

Post image processor 45 performs predetermined post-processes (for example, an image recognition process of the composed image, amplification correction which amplifies a signal level of the composed image, gradation correction of the composed image, and the color-tone correction of the composed image) with respect to a composed image.

Frame memory 46 stores image data, image data is transmitted and received between RGB image processor 42 and IR image processor 43. For example, the image data which is stored in frame memory 46 is a composed target of the image by RGB-IR composer 44, and includes the already captured RGB image and IR image.

Surveillance camera 10 has IR radiation controller 34, drive circuit 35, IR-LED 36, and interface section 50.

For example, the IR radiation controller 34 sends a control signal which instructs the presence or absence of light emission of IR-LED 36 to drive circuit 35 according to the light-emission conditions from IR image processor 43. For example, IR radiation controller 34 sends a pulse width modulation (PWM) signal with respect to drive circuit 35 in order to carry out PWM control on IR-LED 36 according to the light-emission condition from IR image processor 43.

For example, drive circuit 35 receives the control signal or the PWM signal from IR radiation controller 34, and controls the presence or absence of light emission or the amount of light emission of IR-LED 36.

IR-LED 36 emits IR light with respect to the subject at a controlled amount of light emission. That is, IR-LED 36 radiates IR light with respect to the subject. IR-LED 36 is an example of a light emitting unit.

Interface section 50 outputs the composed image which is output from camera-signal processor 40 to the outside. For example, interface section 50 includes a universal serial bus (USB) for outputting the composed image to an external storage medium. For example, interface section 50 includes a communication interface (for example, a local area network (LAN) terminal for connecting to the LAN) in order to transmit the composed image to an external communication device. Here, interface section 50 may output, to the outside, the RGB image and the IR image which generate the composed image.

Next, the image which is captured by imaging section 20 will be described.

The image which is captured by imaging section 20 includes the RGB image, the IR image, and other images. For example, the RGB image does not emit IR light using IR-LED 36, and is an image (one example of the second image) which is captured by imager 24 during a non-light-emission period in which the IR light is not radiated with respect to the subject. For example, the IR image emits IR light using IR-LED 36, and is an image (one example of the first image) which is captured by imager 24 in an emission period in which the IR light is radiated with respect to the subject.

The imaging of the RGB image is controlled such that a color tone component of the RGB image is increased in size according to the imaging parameters. For example, RGB image controller 47 and exposure controller 33 controls the amount of exposure, gain, or the amount of correction of color tone according to the imaging parameters. For example, since the greater the amount of exposure or the larger the gain, the greater the color tone component, the amount of exposure is controlled so as to be great, and the gain is controlled so as be larger. In this case, a noise component of the RGB image may be made greater due to the gain increasing. In addition, in the RGB image, the size of the edge component of the subject may be insufficient and the edge may be unclear.

The imaging of the IR image is controlled such that the gradation component and the edge component of the IR image are increased in size. For example, IR image controller 48 and exposure controller 33 controls the amount of exposure, gain, or the amount of correction of color tone according to the imaging parameters. For example, IR radiation controller 34 controls the amount of light-emission of IR light according to the light-emission conditions. The color tone component of the IR image may be small. It is preferable for the noise component of the IR image to be small.

Here, the present embodiment mainly exemplifies that the IR light is radiated on the subject, and the IR image is obtained, but light other than IR light may be radiated. For example, as long as it is possible to acquire a necessary edge component and tone component from the image which is obtained by radiating light, visible light and ultraviolet light may be used in place of IR light. In a case where the IR light is used, since it is possible to easily enhance the gradation component and the edge component of the obtained image, it is possible to easily obtain a desired gradation component and edge component even in a low illumination environment.

Figure 3:
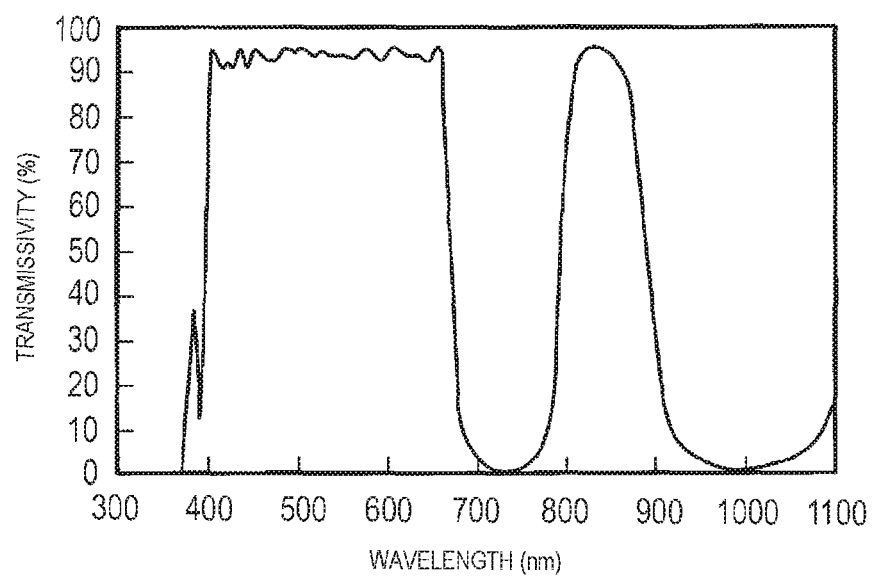
FIG. 3 is a graph illustrating an example of an optical property of a double band-pass filter in the embodiment.

FIG. 3 is a graph illustrating an example of an optical property of double band-pass filter 23. For example, double band-pass filter 23 has a high transmissivity in a visible light region which is in a range of a wavelength of approximately 400 nm to 700 nm and in an infrared region which is in a range of a wavelength of approximately 800 nm to 900 nm.

Visible light which passes through double band-pass filter 23 out of light from the subject is used in the generation of the RGB image. Infrared light which passes through double band-pass filter 23 out of light from the subject is used in the generation of the IR image.

Figure 4A:
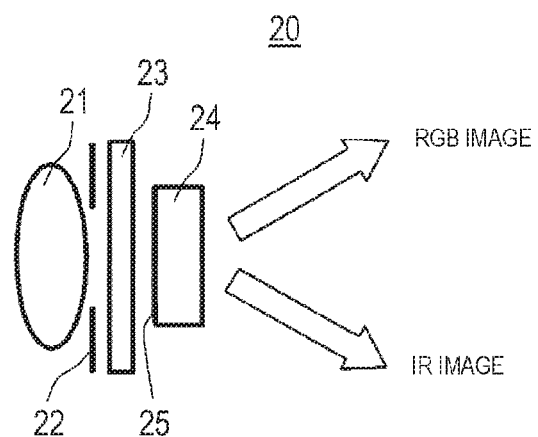
FIG. 4A is a schematic diagram illustrating a configuration example of an imaging section in the embodiment.
Figure 4B:
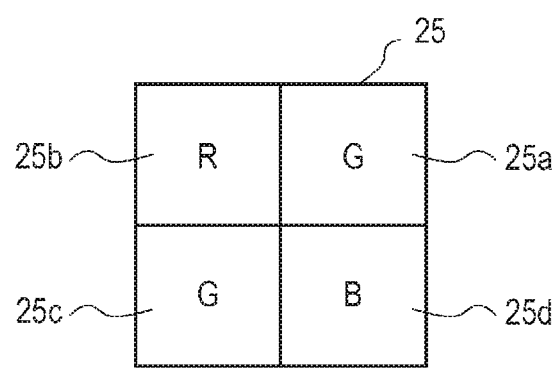
FIG. 4B is a schematic diagram illustrating a configuration example of the imaging section in the embodiment.

FIGS. 4A and 4B are schematic diagrams illustrating configuration examples of imaging section 20. FIG. 4A is a schematic diagram illustrating an example of a disposition relationship of each element in imaging section 20. In FIG. 4A, imaging section 20 has lens 21, aperture 22, double band-pass filter 23, and imager 24 which are disposed on an optical axis. Color filter 25 is included on a front surface of imager 24.

FIG. 4B is a schematic diagram illustrating an example of a Bayer array of color filter 25. Color filter 25 includes two G filtering sections 25a and 25c through which G (green) light passes, red filtering section 25b through which R (red) light passes, and B filtering section 25d through which B (blue) light passes. Here, in addition to light of each color, each filtering section 25a to 25d passes IR light therethrough.

For example, imager 24 generates the RGB image and the IR image by time division by switching imaging parameters and the presence or absence of light emission of the IR light.

For example, in a case where the RGB image is obtained in the low illumination environment, RGB image controller 47 sets so as to lengthen the exposure time as the imaging parameter, and sets such as to increase the gain as the imaging parameter. In a state of setting in such a manner, imager 24 acquires the RGB image.

For example, in a case where the IR image is obtained in a low illumination environment. IR radiation controller 34 controls such that the IR light is emitted toward the subject by IR-LED 36 with respect to drive circuit 35. In addition, IR image controller 48 sets so as to shorten the exposure time as the imaging parameter, and sets so as to reduce the gain as the imaging parameter. In a state of setting in such a manner, imager 24 acquires the IR image. Here, for example, low illumination refers to a case in which the illuminance is less than or equal to 0.1 lux.

Here, FIGS. 3, 4A, and 4B exemplify using double band-pass filter 23, but light which is received by imager 24 may include light other than the IR component. For example, in place of color filter 25, an all-pass filter, a visible cut filter, and an infrared band-pass filter may be used. Even if a filter other than double band-pass filter 23 is used, a predetermined gradation component and edge component may be obtained from the image which is obtained in place of the IR image.

Next, an operation example of the surveillance camera 10 will be described.

Figure 5:
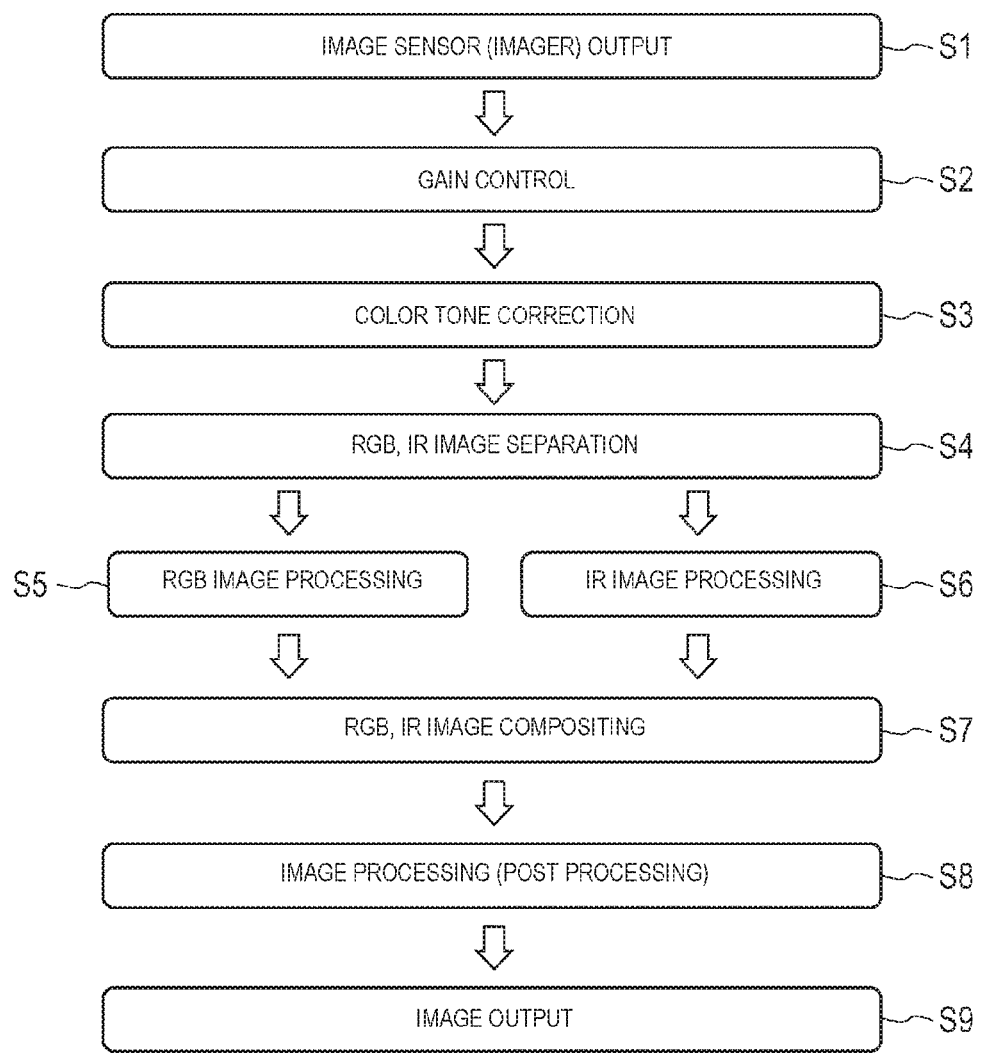
FIG. 5 is a flow chart illustrating an example of a flow of an entire imaging operation by the surveillance camera in the embodiment.

FIG. 5 is a flow chart illustrating an example of a flow of an entire imaging operation by surveillance camera 10.

First, when imager 24 receives light from the subject spanning the exposure time which is set using exposure controller 33, imager 24 obtains an image and outputs to gain controller 31 (S1 image sensor (imager) output operation).

Gain controller 31 amplifies a signal of the RGB image out of images from imager 24 using gain which is set by RGB image controller 47. In addition, gain controller 31 amplifies a signal of the IR image out of images from imager 24 using gain which is set by IR image controller 48 (S2 gain control operation).

Color-tone corrector 32 corrects color tone of the RGB image at an amount of correction of color tone which is designated by RGB image controller 47. In addition, color-tone corrector 32 corrects color tone of the IR image at an amount of correction of color tone which is designated by IR image controller 48 (S3 color-tone correction operation).

RGB-IR separator 41 separates the RGB image and the IR image from color-tone corrector 32 (S4 RGB and IR image separation operation). RGB-IR separator 41 sends the RGB image to RGB image processor 42, and sends the IR image to IR image processor 43. That is, RGB-IR separator 41 switches an output destination of the image by time division.

RGB image processor 42 performs the predetermined image process with respect to the RGB image from RGB-IR separator 41 (S5 RGB image processing operation). IR image processor 43 performs the predetermined image process with respect to the IR image from RGB-IR separator 41 (S6 IR image processing operation).

For example, RGB image controller 47 and exposure controller 33 designates, for example, the amount of light exposure, the exposure time, the gain, and the amount of correction of the color tone according to the imaging parameters for capturing the RGB image.

For example, IR image controller 48, exposure controller 33, and IR radiation controller 34 designates, for example, the amount of light exposure, the exposure time, the gain, the amount of correction of the color tone, the presence or absence of light emission of the IR image, and the amount of light emission of the IR light according to the imaging parameters and the light-emission conditions for capturing the IR image.

RGB-IR composer 44 composes the RGB image which is image processed by RGB image processor 42 and the IR image which is image processed using IR image processor 43 at a predetermined timing (S7 RGB and IR image composing operation).

Post image processor 45 performs a predetermined post process with respect to the composed image (composite image) (S8 image processing (post processing) operation). Interface section 50 outputs the post-processed composed image to the outside (S9 image output operation).

According to the operation example by surveillance camera 10 which is indicated in FIG. 5, it is possible to acquire and compose the RGB image following the imaging parameters for capturing the RGB image and the IR image following the imaging parameters for capturing the IR image. Due to the composing of the image, even in the low illumination environment, a vivid image where contours are sharp is obtained, and it is possible to easily improve the quality of the obtained image.

Figure 6:
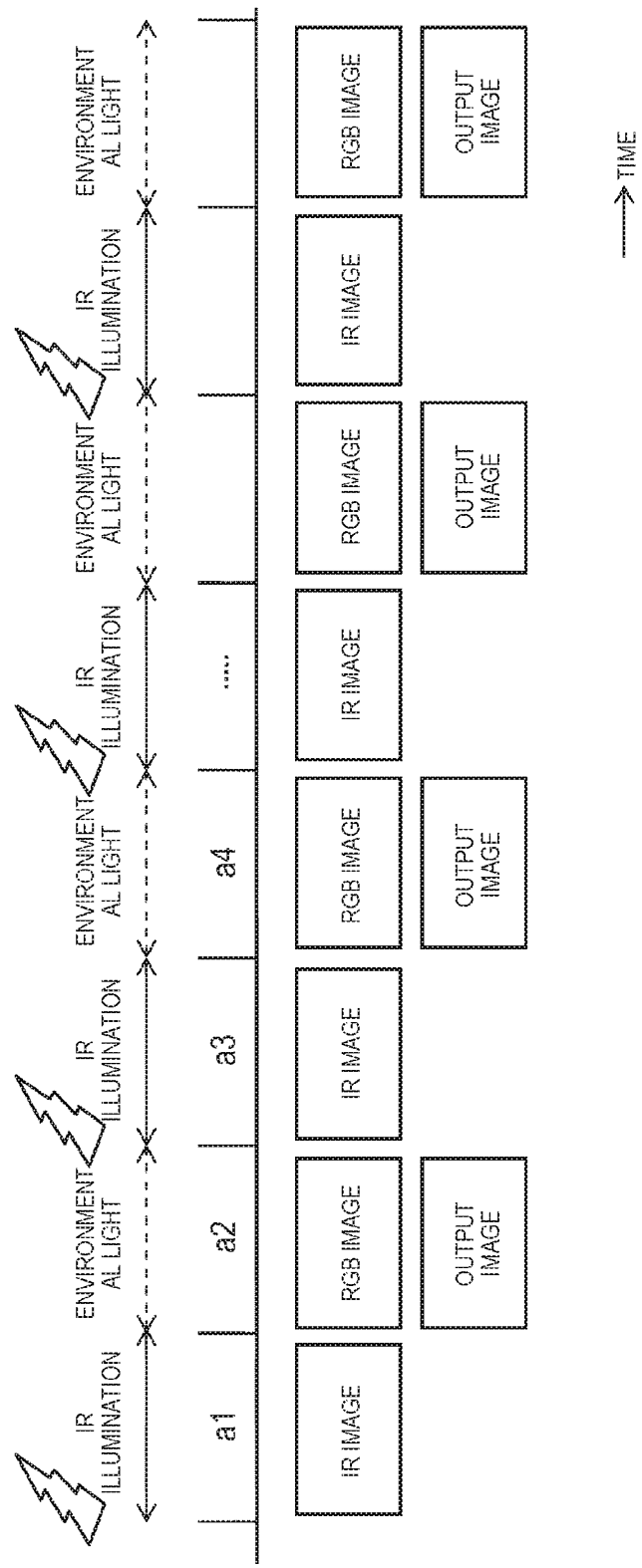
FIG. 6 is a schematic diagram for describing an imaging operation example according to a global shutter method by the surveillance camera in the embodiment.

FIG. 6 is a schematic diagram which describes an imaging operation example according to a global shutter method by surveillance camera 10.

For example, in a case where imager 24 is configured to include the CCD sensor, the image is captured by the global shutter method. In the global shutter method, a shutter operation is carried out by all pixels of imager 24 at the same timing. In the global shutter method, since the RGB image and the IR image are captured by alternately switching by time division, a capturing period of the RGB image and a capturing period of the IR image are switched in each frame.

Since one image is output by composing the alternately captured RGB image and IR image, when comparing to an ordinary imaging mode, a frame rate of the composed image (output image) is 1/2. For example, as the ordinary imaging mode, without switching imaging method, an imaging mode is known which ordinarily captures the RGB image, or an imaging mode is known which ordinarily captures the IR image.

For example, the light-emission conditions in the case of the global shutter method include information on an instruction for switching, in each frame, between the light emission period in which the IR light is emitted, and the non-light-emission period in which the IR light is not emitted. In the light emission period, IR radiation is performed on the subject, and during the non-light-emission period, IR radiation is not performed with respect to the subject.

In FIG. 6, in initial frame a1, IR radiation is performed, imager 24 receives light which passes through color filter 25, and the IR image is obtained.

In subsequent frame a2, the imaging parameters and the light-emission conditions are switched, IR radiation is not performed, and environmental light is used to capture. Imager 24 receives light which is passed through color filter 25 as each of R, G, and B, and the RGB image is obtained.

In addition, in frame a2, RGB-IR composer 44 starts composing the IR image and the RGB image in parallel to the capturing of the RGB image. Thereafter, the same operations are repeated. That is, in frames a3, a5, . . . , surveillance camera 10 operates in the same manner as the operation in frame a1. In frames a4, a6, . . . , surveillance camera 10 operates in the same manner as the operation in frame a2.

In the global shutter method, different from a rolling shutter method which will be described later, the imaging timing is not different in each line in the image, and all pixels are captured at the same timing. Accordingly, it is possible to match the imaging timing of the RGB image and the IR image, and the light emission timing of IR-LED 36, and both timings are accommodated in one frame. Accordingly, according to the operation example of surveillance camera 10 which is indicated in FIG. 6, since the two images are composed, although a reduction of the frame rate in comparison to an ordinary imagining mode is generated, the reduction of frame rate is suppressed. Accordingly, for example, even in a case where the subject is moved at high speed, it is possible to suppress reduction in image quality of the image which includes the subject.

Figure 7:
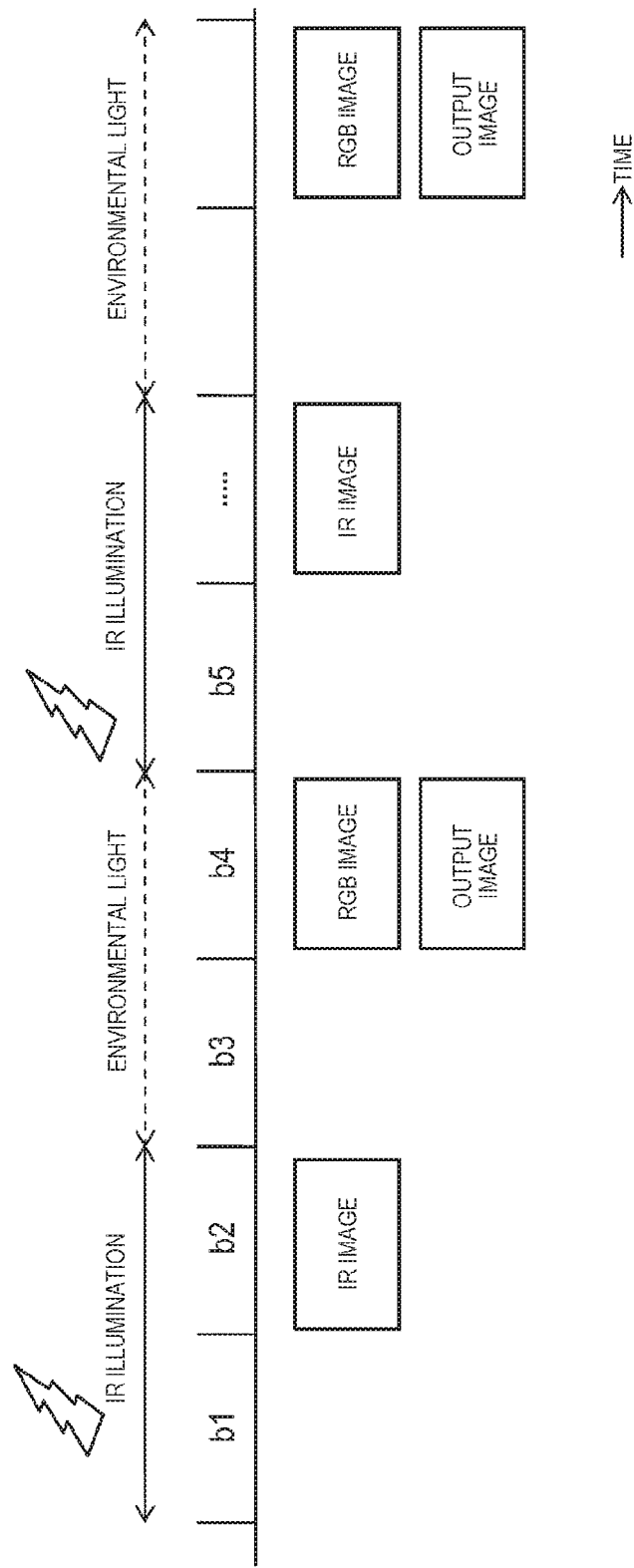
FIG. 7 is a schematic diagram for describing an imaging operation example according to a rolling shutter method by the surveillance camera in the embodiment.

FIG. 7 is a schematic diagram which describes an imaging operation example according to the rolling shutter method by surveillance camera 10.

For example, in a case where imager 24 is configured to include the CMOS sensor, the image is captured by a line exposure sequential reading method (rolling shutter method). In the rolling shutter method, the image timing is different in each line in the image, and the period from the start to the end of the imaging of the RGB image and the IR image is not accommodated in one frame, and spans two continuous frames. For this reason, during switching between the RGB image and the IR image, the initial one frame is discarded according to the switching. Accordingly, in the rolling shutter method, in comparison to the global shutter method, and the frame rate is 1/2. In addition, the IR radiation is performed spanning two frames in order to capture the IR image such that the IR light is radiated in the capturing period of the IR image.

In initial frame b1 (dummy frame), the IR radiation is started. In frame b1 and subsequent frame b2, imager 24 receives light which is passed through color filter 25 as the IR image.

Subsequently, in frame b3 (dummy frame) and frame b4, the imaging parameters and the light-emission conditions are switched, IR radiation is not carried out, and the RGB image is captured using environmental light. In addition, in frame b4, RGB-IR composer 44 starts composing the IR image which is captured in frame b2 in parallel to the capturing of the RGB image and the RGB image which is captured in frame b4, and the composed image (output image) is generated.

Thereafter, the same operations are repeated. That is, in frames b5, b9, . . . , surveillance camera 10 operates in the same manner as the operation in frame b1. In frames b6, b10, . . . , surveillance camera 10 operates in the same manner as the operation in frame b2. In frames b7, b11, . . . , surveillance camera 10 operates in the same manner as the operation in frame b3. In frames b8, b12, . . . , surveillance camera 10 operates in the same manner as the operation in frame b4.

Figure 8:
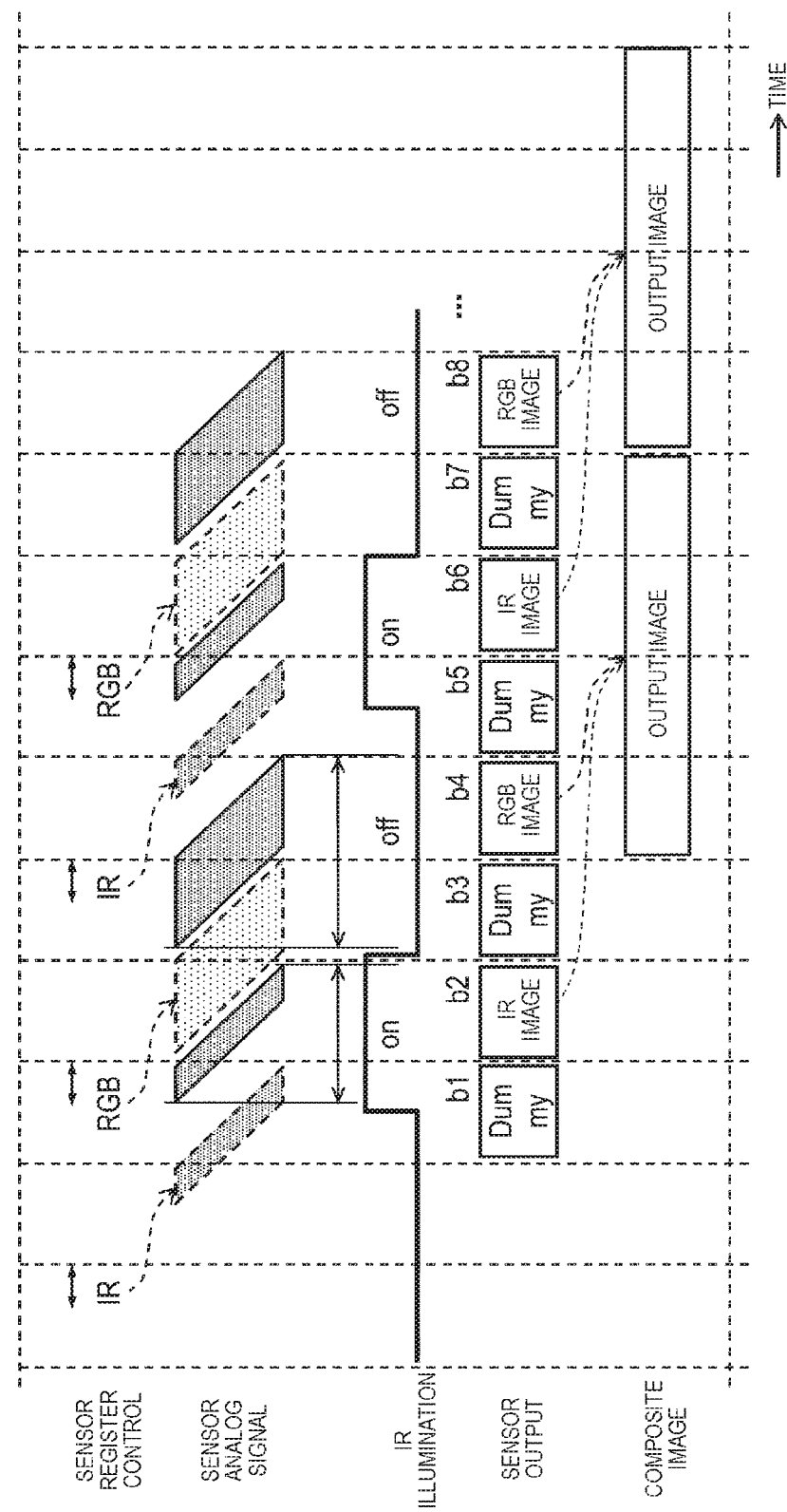
FIG. 8 is a timing chart illustrating a specific example of the imaging operation according to the rolling shutter method by the surveillance camera in the embodiment.

FIG. 8 is a timing chart illustrating an operation example of the imaging operation according to the rolling shutter method by surveillance camera 10.

First, in frame b0, for example, RGB image processor 42 sets the imaging parameters and the light-emission conditions (sensor register control) which are appropriate in the RGB image with respect to exposure controller 33, IR radiation controller 34, and RGB image controller 47.

The sensor register control indicates that the imaging parameters which are held in the memory (register), which is not illustrated, are set in each component.

In frame b1, for example, IR image processor 43 switches the imaging parameters and the light-emission conditions (sensor register settings) which are appropriate in the IR image with respect to exposure controller 33, IR radiation controller 34, and IR image controller 48. Thereby, IR radiation is switched to ON by IR radiation controller 34, and brightness of the captured IR image changes during capturing. For this reason, since the image which is obtained in frame b1 is a blurred image, IR image processor 43 discards the image which is captured in frame b1 as the dummy. That is, IR image processor 43 has a function as an image discarding unit.

In frame b2, imager 24 acquires the IR image which is captured spanning from frame b1 to frame b2 after switching the imaging parameters and the light-emission conditions.

In frame b3, imager 24 acquires the image captured spanning from frame b2 to frame b3. In frame b3, the imaging parameters and the light-emission conditions are set which are appropriate to the IR image. Thereby, since the IR radiation is switched from ON to OFF, the brightness of the captured image changes during capturing. For this reason, since the image which is obtained in frame b3 is a blurred image, RGB image processor 42 discards the image which is captured in frame b3 as the dummy. That is, RGB image processor 42 has a function as an image discarding unit.

In frame b4, imager 24 acquires the RGB image which is captured spanning from frame b3 to frame b4 after switching the imaging parameters and the light-emission conditions.

In addition, in frame b4, RGB-IR composer 44 generates the composed image by composing the IR image which is acquired in frame b2 and the RGB image which is acquired in frame b4, and outputs to post image processor 45 as the output image.

Thereafter, the same operations are repeated. That is, in frames b5, b9, . . . , surveillance camera 10 operates in the same manner as the operation in frame b1. In frames b6, b10, . . . , surveillance camera 10 operates in the same manner as the operation in frame b2. In frames b7, b11, . . . , surveillance camera 10 operates in the same manner as the operation in frame b3. In frames b8, b12, . . . , surveillance camera 10 operates in the same manner as the operation in frame b4.

Here, FIG. 8 exemplifies that the IR image is captured first, and the RGB image is captured after, but may be reversed. Due to the IR image being captured first and the RGB image being captured after, in comparison to a case of capturing in the reverse order, it is possible for the difference of the capturing time between the IR image and the RGB image to be small.

For example, in the capturing of the RGB image, in a case where the color tone component is acquired more greatly in low illumination, the exposure time is lengthened. That is, the capturing period of the RGB image is lengthened. Meanwhile, in the capturing of the IR image, even in a case where the edge component and the gradation component are more greatly acquired in low illumination, the exposure time may not be lengthened due to the IR radiation being carried out. Accordingly, the capturing period of the RGB image is longer than the capturing period of the IR image. Accordingly, the difference between the capturing time of the IR image and the capturing time of the RGB image, and the generation time of the composed image is small and it is possible that a residual image of the composed image is slight due to the IR image being captured before the RGB image.

Here, in FIG. 8, the RGB image which is used in the generation of the composed image may be captured spanning a plurality of frames. Thereby the high color tone RGB image is obtained.

Figure 9:
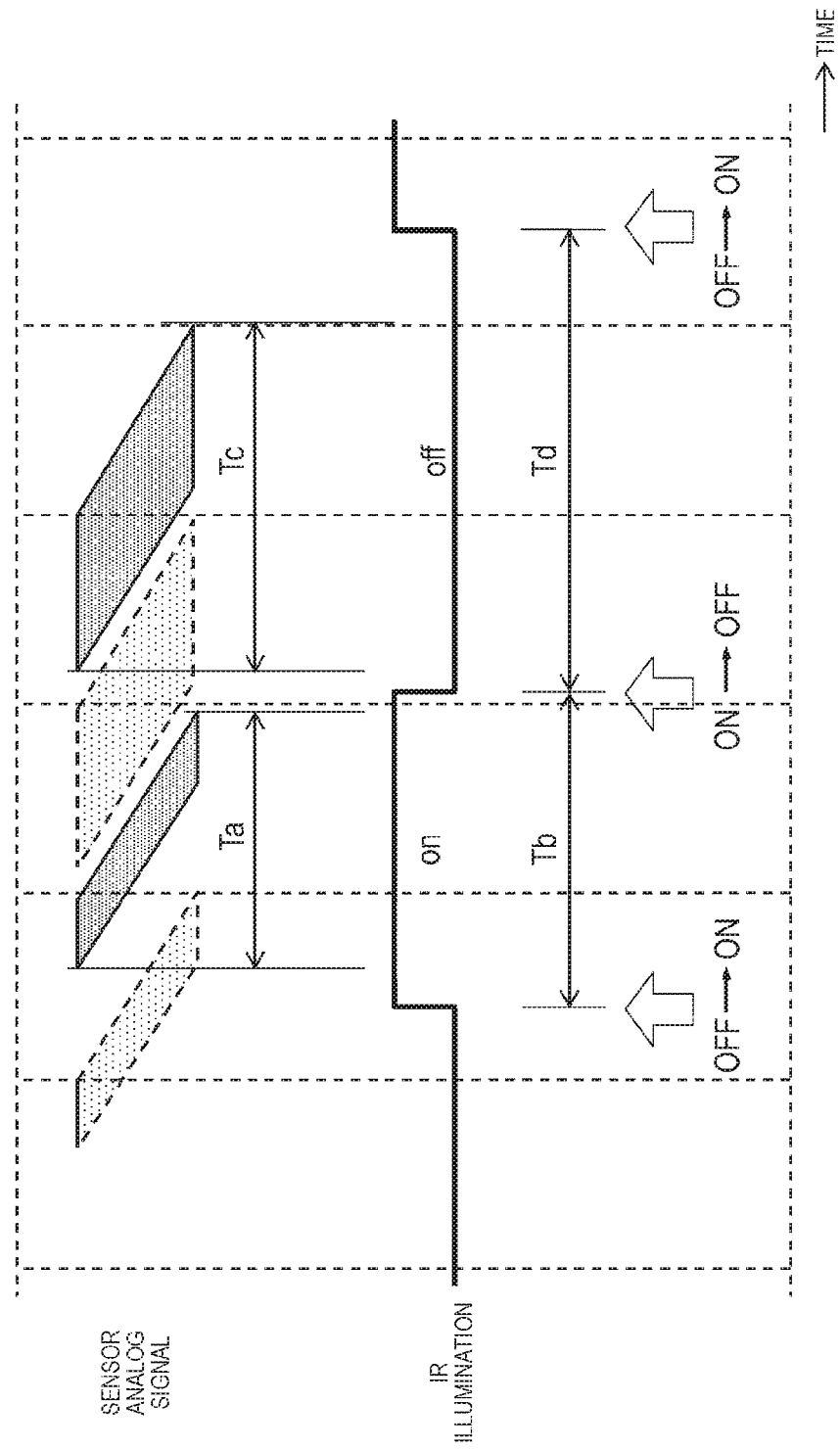
FIG. 9 is a timing chart illustrating a specific operation example by the surveillance camera during ON-OFF switching of infrared (IR) illumination in the timing chart in FIG. 8.

FIG. 9 is a timing chart illustrating a specific operation example by surveillance camera 10 during an ON-OFF switching of IR radiation in the timing chart in FIG. 8.

IR image acquisition time Ta at which the IR image is acquired by imager 24 is shorter than IR radiation ON time Tb in which IR radiation is set to ON. RGB image acquisition time Tc at which the RGB image is acquired by imager 24 is shorter than IR radiation OFF time Td in which IR radiation is set to OFF. That is, the IR image is captured under the IR radiation. Meanwhile, the RGB image is captured under environmental light. In addition, the switching of IR radiation is performed in a period in which the image of the composing target is not acquired. RGB image processor 42 and IR image processor 43 discards the image which is being captured during switching of the IR radiation as a dummy.

Thereby the IR light is radiated spanning a period in which the IR image is captured, and it is possible to acquire the image of the subject in which the IR component is enhanced. In addition, the IR light is not radiated spanning a period in which the RGB image is captured, and it is possible to acquire the image of the subject in which the IR component is not enhanced. Consequently, for example, it is possible to improve extraction accuracy of the edge component and the like from the IR image, and it is possible to improve extraction accuracy of the color tone component and the like from the RGB image. Consequently in the composed image, for example, it is possible to add the color tone component with high extraction accuracy, and it is possible to improve image quality of the composed image with respect to the edge component with high extraction accuracy.

Here, although not particularly illustrated, in the case of the global shutter method, since a capturing time difference is not generated by the line in the image, the ON/OFF switching of the IR radiation is performed at a period in which the image of the composing target is not acquired. In addition, since the image is not captured during switching of the IR radiation, an image is not generated as a dummy.

Figure 10:
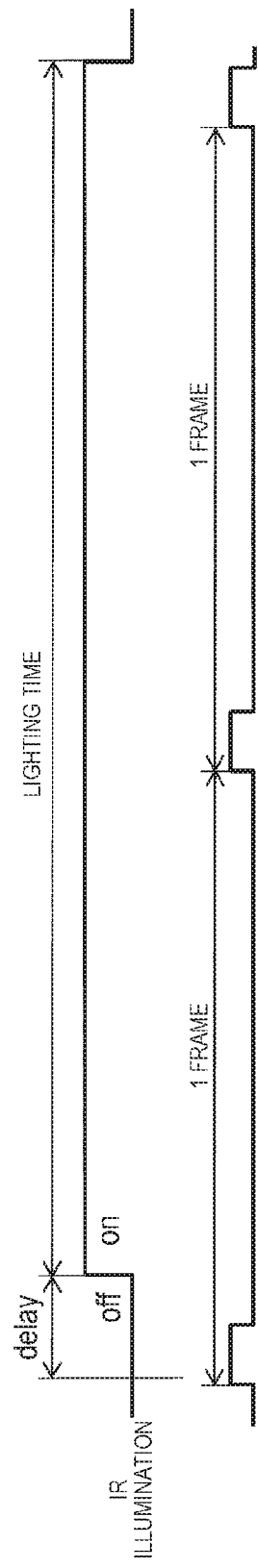
FIG. 10 is a timing chart illustrating an example of a relationship between IR radiation ON/OFF and vertical synchronization in the embodiment.

FIG. 10 is a timing chart illustrating an example of a relationship between IR radiation ON/OFF and vertical synchronization. One frame is created by one ON/OFF period of vertical synchronization signal VSYNC which is output by imager 24.

IR radiation controller 34 switches the IR radiation, that is. IR-LED 36 to ON after vertical synchronization signal VSYNC starts. Exposure controller 33 controls such that exposure of imager 24 starts after the IR radiation is set to ON.

When the exposure time which is set by the imaging parameters ends, exposure controller 33 controls such that the exposure light of imager 24 ends. IR radiation controller 34 switches the IR radiation to OFF after the exposure light of imager 24 is ended.

In this manner, each frame is formed according to vertical synchronization signal VSYNC which is output from imager 24, and each component of surveillance camera 10 (for example, IR radiation controller 34 and RGB-IR composer 44) are synchronous.

In addition, the timing at which the IR radiation is set to ON, that is, a timing at which the light-emission conditions are switched, and the timing at which the imaging parameters are switched may be synchronous. Thereby, surveillance camera 10 is able to generate the RGB image and the IR image, it is possible to generate composed image, and it is possible to improve the image quality of the composed image using imaging parameters which are appropriate to each light-emission condition.

Here, in FIG. 10, since the rolling shutter method is assumed, approximately equivalent to two frames, IR radiation is set to ON, but in the global shutter method, equivalent to one frame, IR radiation is set to ON.

FIG. 11 is a schematic diagram illustrating an example of PWM control and imaging parameters of IR radiation in each imaging scene. The amount of control of the PWM control of the IR radiation is one light-emission condition corresponding to the amount of light emission of the IR light.

The periphery of the subject is slightly dark, or the subject assumes a first imaging scene which is positioned close to surveillance camera 10. The brightness of the periphery is detected by a known technique, for example, detected by the illuminance sensor which is not shown in the drawings. The distance between the subject and surveillance camera 10 is detected by the known technique, for example, is detected by a distance measuring sensor which is not shown in the drawings or a value of a zoom factor of imaging section 20, or a predetermined imaging process by surveillance camera 10. A state in which the periphery is slightly dark is an example of a low illumination scene.

In the first imaging scene, IR radiation controller 34 reduces the amount of light of the IR illuminance by reducing a duty ratio of the PWM control. In addition, in the first imaging scene, in RGB image processor 42 and IR image processor 43, the imaging parameters may be set such that the imaging use of the IR image and the imaging use of the RGB image are different. For example, in the first imaging scene, in a case where the IR image is captured, imaging parameter A is set, and in a case where the RGB image is captured, imaging parameter B is set.

Meanwhile, a second imaging scene is assumed in which the periphery of the subject is dark, or the subject is positioned far from surveillance camera 10. A state in which the periphery is dark is an example of a low illumination scene, and is a darker state than a state in which the periphery is slightly dark.

In the second imaging scene, IR radiation controller 34 increases the amount of light of the IR illuminance by increasing a duty ratio of the PWM control. In addition, in the second imaging scene, in RGB image processor 42 and IR image processor 43, the imaging parameters may be set so as to be different in the IR image and the RGB image. For example, in the second imaging scene, in a case where the IR image is captured, imaging parameter C is set, and in a case where the RGB image is captured, imaging parameter D is set.

For example, in imaging parameters A and B in the first imaging scene, the gain is small and the exposure time is set to be short in comparison to imaging parameters C and D in the second imaging scene.

In this manner, at least one of the imaging parameters and the light-emission conditions may be set to be different according to the distance between the illuminance of the vicinity of the subject or surveillance camera 10 and the subject. In addition, the imaging parameters may be set to be different according to whether the imaging parameter is for capturing the RGB image or the imaging parameter is for capturing the IR image.

Here, as described above, in a case where a component of an image which is estimated from set imaging parameters A to D (estimated value) and a component of an image which is actually obtained (actual value) are disassociated, RGB image processor 42 and IR image processor 43 may update and fine tune the imaging parameter.

In surveillance camera 10 of the present embodiment, for example, in the emission period in which IR radiation is performed, the IR image is captured using imaging parameters of a short exposure period and low gain which are appropriate in capturing of the IR image. Meanwhile, during the non-light-emission period in which environmental light is used and IR radiation is not carried out, for example, the RGB image is captured using imaging parameters of long exposure time and high gain which are appropriate in capturing of the RGB image. The non-light-emission period is continuous to the light emission period. The captured IR image and RGB image are composed, and the composed image is obtained. For example, in the composing of the image, the edge region of the subject image is detected from the IR image, and the color tone is applied to the subject image using a color signal which is obtained from the RGB image.

Thereby, even if the subject is captured in the low illumination environment, it is possible to obtain a composed image with high color reproducibility. In addition, it is possible to easily acquire the edge region using the IR image, and it is possible to easily acquire a vivid color tone using the RGB image. Accordingly, it is possible to easily improve quality of the captured image in the low illumination environment.

In addition, since a large-scale imaging system is not necessary, surveillance camera 10 is able to reduce the cost of a device for acquiring a color image in the low illumination environment, and simplify adjustment and maintenance.

In addition, IR image processor 43 may set the imaging parameters used to capture the IR image such that the exposure time is short and gain is small. RGB image processor 42 may set the imaging parameters used to capture the RGB image such that the exposure time is long and gain is great. Thereby for example, imaging which is appropriate for the IR image and the RGB image is possible, it is possible to enhance a characteristic of the IR image (for example, the edge component or the gradation component), and it is possible to enhance a characteristic of the RGB image (for example, the color tone component). Accordingly, it is possible to easily improve quality of the captured image in the low illumination environment.

In addition, light from the subject may be received through double band-pass filter 23. In a case in which double band-pass filter 23 is used, for example, in comparison to a case in which the RGB filter and the IR-cutoff filter are used, and mechanically setting the IR-cutoff filter ON and OFF, ON/OFF switching of the IR-cutoff filter is unnecessary. Accordingly, it is possible to switch between acquisition of the IR image and acquisition of the RGB image at high speed, it is possible to improve the real-time performance of the composed image, and for example, it is possible to improve tracking accuracy even in a subject which is moved at high speed.

In addition, RGB image processor 42 and IR image processor 43 may be set such that at least one of the imaging parameters and the light-emission conditions are different in a case where the subject is close to and surveillance camera 10. Thereby, it is possible to suppress a change of quality of the captured image according to the distance from the subject to surveillance camera 10.

In addition, surveillance camera 10 may capture and compose an image corresponding to the global shutter method. In this case, it is possible to improve the quality of the captured image in the low illumination environment by suppressing a reduction in the frame rate of the composed image.

In addition, surveillance camera 10 may capture and compose an image corresponding to the rolling shutter method. In this case, since the CMOS sensor is adopted as imager 24, it is possible to make the cost of surveillance camera 10 low.

In addition, in a case where surveillance camera 10 lights the IR radiation by time division, when comparing to a case where surveillance camera 10 is ordinarily lit not by time division, it is possible to suppress interference of a signal due to leakage light from double band-pass filter 23, and it is possible to suppress a reduction of extraction accuracy of a characteristic amount from the RGB image. Accordingly it is possible to improve the image quality of the composed image which uses the RGB image.

Modification Example 1

In the embodiment described above, imager 24 in which color filter 25 is incorporated on the front surface is exemplified, but another imager 24 may be used. In Modification Example 1, in place of imager 24, surveillance camera 10 is exemplified with RGB-IR sensor 55 in which color filter 56 is incorporated on the front surface. Here, even in a case where RGB-IR sensor 55 is used, surveillance camera 10 may control light emission of the IR radiation.

Figure 12A:
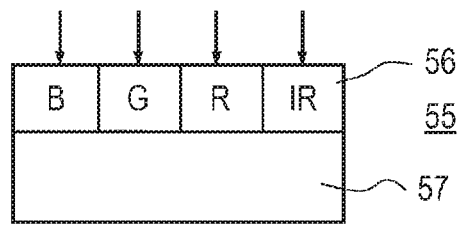
FIG. 12A is a schematic diagram illustrating a configuration example of an RGB-IR sensor in Modification Example 1.
Figure 12B:
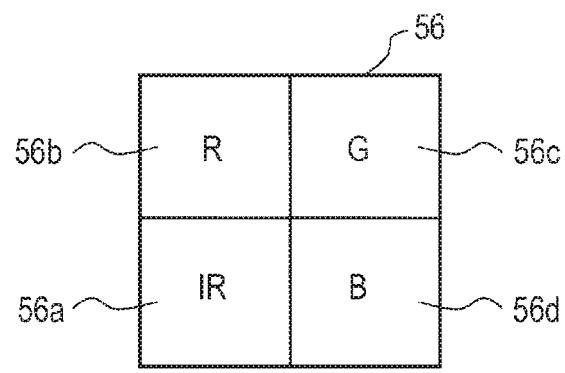
FIG. 12B is a schematic diagram illustrating a configuration example of the RGB-IR sensor in Modification Example 1.
Figure 12C:
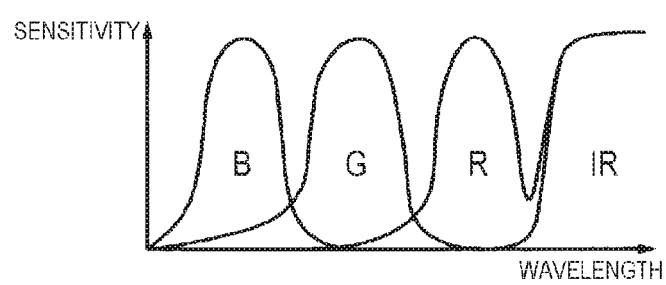
FIG. 12C is a graph illustrating an example of an optical property of the RGB-IR sensor in Modification Example 1.

FIGS. 12A, 12B, and 12C are schematic diagrams for describing RGB-IR sensor 55.

FIG. 12A is a sectional view illustrating an example structure of RGB-IR sensor 55. RGB-IR sensor 55 is configured to include color filter 56 which is disposed on sensor section 57 and on the front surface (lens 21 side) of sensor section 57.

FIG. 12B is a schematic diagram illustrating an example array of color filter 56. Color filter 56 is configured by a Bayer array, and has filtering sections 56b, 56c, 56d, and 56a through which R, G, B, and IR light respectively pass. Filtering section 56a is a filter through which infrared light (IR light) passes. In place of filtering section 56a through which the IR light passes, a filter may be provided through which white light (W light) passes, and light which is incident to filtering section 56a may entirely pass through.

FIG. 12C is a graph illustrating an example of an optical property of RGB-IR sensor 55. As shown in FIG. 12C, RGB-IR sensor 55 has high sensitivity in respective wavelength regions of R, G, B, and IR.

The configuration of RGB-IR sensor 55 is not limited to the configuration exemplified in FIGS. 12A and 12B. For example, in RGB-IR sensor 55, instead of one G filtering section which has two color-image sensors in the related art, IR filtering section 56a may be added. In addition, RGB-IR sensor 55 may not be provided with IR filtering section 56a, and surveillance camera 10 may derive a difference between the entire light which is passed through and each light of R, G, and B which is passed through, and color reproducibility may be improved based on the difference.

It is possible to simultaneously acquire the RGB image and the IR image in one imaging operation without switching the imaging parameters by time division by using RGB-IR sensor 55. In addition, surveillance camera 10 which has RGB-IR sensor 55 may perform light emission control of the IR radiation by switching the imaging parameters and the light-emission conditions by time division, and may further improve quality of the image which is captured in the low illumination environment.

Modification Example 2

In Modification Example 2, in place of imaging section 20, surveillance camera 10 is assumed to be provided with imaging section 60 that includes two image sensors (imagers).

Figure 13A:
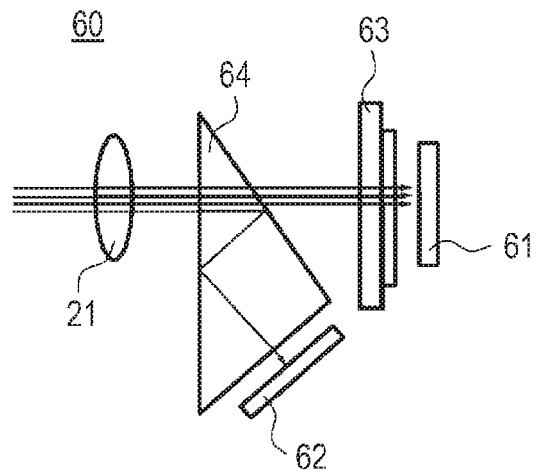
FIG. 13A is a schematic diagram illustrating a configuration example of an imaging section in Modification Example 2.

FIG. 13A is a schematic diagram illustrating a configuration example of imaging section 60. Imaging section 60 is disposed on an optical axis of lens 21, and has prism 64, IR-cutoff filter 63, and color-image sensor 61. In addition, imaging section 60 has monochrome-image sensor 62. Prism 64 is an example of a spectroscopic device, but in place of prism 64, another spectroscopic device may be used.

The light which passes through prism 64 out of the light which is condensed by lens 21 is received by color-image sensor 61, and the RGB image is captured after the IR light is cut off by IR-cutoff filter 63. Meanwhile, light which is refracted by prism 64 is received by monochrome-image sensor 62, and the IR image is captured. Even in this case, surveillance camera 10 may execute light emission control of the IR radiation.

Figure 13B:
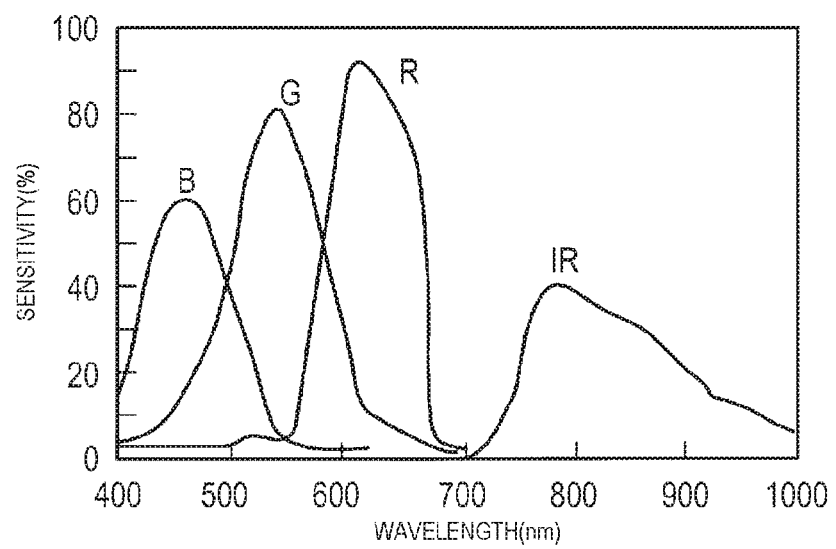
FIG. 13B is a graph illustrating an optical property of the imaging section in Modification Example 2.

FIG. 13B is a graph illustrating an optical property of imaging section 60. As shown in FIG. 13B, it is possible to obtain high sensitivity in the respective wavelength regions of R, G, B, and IR.

For example, in imaging section 60, IR-cutoff filter 63 may be mechanically switched ON/OFF on an optical path on color-image sensor 61 side. For example, in a case where the RGB image is captured, IR-cutoff filter 63 is switched ON, and the color tone is improved. For example, in a case where the last output image is black and white, in imaging section 60, when IR-cutoff filter 63 is mechanically switched OFF, it is possible to increase sensitivity of monochrome-image sensor 62.

In addition, physical resolution of color-image sensor 61 and monochrome-image sensor 62 may be different. Even in this case, it is possible to compose the IR image and the RGB image by registration being performed by post image processor 45.

For example, monochrome-image sensor 62 is able to increase the pixel size even in the same sensor size, and is able to make sensitivity high by making resolution low. Color-image sensor 61 may make resolution high by making sensitivity low. It is possible to improve the image quality in the normal mode in the daytime, and the like in combination by using such color-image sensor 61 and monochrome-image sensor 62.

In imaging section 60, it is possible to easily dispose IR-cutoff filter 63 on the optical path, and it is possible to simultaneously capture the RGB image and the IR image. In addition, it is possible to improve color reproducibility by providing IR-cutoff filter 63. In addition, it is possible to increase an area per pixel of each image sensor by separating color-image sensor 61 and monochrome-image sensor 62, and it is possible to make sensitivity high. Accordingly, it is possible to improve quality of the captured image under low illumination. In addition, surveillance camera 10 which has imaging section 60 may perform light emission control of the IR radiation by switching the imaging parameters by time division, and may further improve quality of the image which is captured under the low illumination environment.

Although various embodiments are described above while referring to the drawings, needless to say, the present disclosure is not limited to the examples. According to a person skilled in the art, within the scope which is set forth in the claims, it is obvious that it is possible to conceive of various modification examples and correction examples, and therein is naturally understood as belonging to the technical scope of the present disclosure.

In the embodiment described above, the IR image using the IR light in enhancement of the edge component and the gradation component of the subject image is exemplified, but an image which is captured using the ultraviolet light (UV) may be used. Alternatively, for example, if the edge component and the gradation component are enhanced, in place of the IR image, the image on which visible light is radiated may be used. The IR light and the UV light are examples of non-visible light. The visible light and the non-visible light are examples of auxiliary light.

In the embodiment described above, for example, it is exemplified that the process which is indicated in FIG. 5 is entirely executed by surveillance camera 10, but some processes may be executed by surveillance camera 10, and some process may be executed by another apparatus (for example, a personal computer (PC)). That is, the imaging system may be formed which is provided with surveillance camera 10 and a PC. In this case, for example, the PC may carry out processing at high speed using a compute unified device architecture (CUDA).

For example, surveillance camera 10 performs the processes from image sensor output of S1 to color tone correction of S3 in FIG. 6, and data which includes processed image data is transmitted to the PC via a network or the like. The PC receives the data from surveillance camera 10, and performs processes from image separation of S4 to image output of S9 with respect to the received image data. In this case, for example, the PC is provided with a communicator which receives the RGB image and the IR image, and an image composer which composes the RGB image and the IR image. Thereby, it is possible reduce processing load on surveillance camera 10.

In addition, in the present embodiment, surveillance camera 10 is exemplified as an example of the imaging device, but another imaging device (for example, a vehicle camera, an industrial camera, a medical camera, and a consumer camera) may be used.

Summary of an Aspect of the Present Disclosure

An imaging device of an aspect of the present disclosure is provided with a condition designating unit which designates, by time division, imaging conditions for capturing an image, and light emission conditions for emitting auxiliary light, an imaging section which captures an image including a subject according to the imaging conditions, a light emitting unit which emits auxiliary light with respect to the subject according to the light emission conditions, and an image composer which combines a first image that is captured under a first imaging condition during a light emission period in which the auxiliary light is emitted and a second image which is captured under a second imaging condition during a non-light-emission period which is continuous to the light emission period and the auxiliary light is not emitted.

According to this configuration, for example, it is possible to extract the edge component and the gradation component from the first image, it is possible to extract the color tone component from the second image, and it is possible to apply the color tone in an image which includes the subject based on the extracted component. Thereby, even if the subject is captured in the low illumination environment, it is possible to obtain a composed image with high color reproducibility. In addition, since a large-scale apparatus is not necessary as an imaging device, it is possible to reduce costs which are necessary for the device, and simplify adjustment and maintenance of the device. Accordingly, it is possible to easily improve quality of the captured image in the low illumination environment.

In the imaging device of an aspect of the present disclosure, the condition designating unit switches the imaging conditions and the light-emission conditions in synchronization.

According to this configuration, for example, it is possible to easily acquire the first image in which the edge component and the gradation component are great and the second image in which the color tone component is great. Accordingly, since it is possible for the imaging device to easily derive a composed image, it is possible to easily improve quality of an image which is captured in a low illumination environment.

The imaging device of the aspect of the present embodiment, in which the condition designating unit designates at least one of the imaging conditions and the light-emission conditions according to the distance between the subject and the imaging section.

According to this configuration, it is possible to capture the first image and the second image using the imaging conditions and the light-emission conditions which are appropriate to the distance between the subject and the imaging device.

The imaging device of the aspect of the present embodiment, in which the condition designating unit designates at least one of the imaging conditions and the light-emission conditions according to illuminance of a region which includes the subject.

According to this configuration, it is possible to capture the first image and the second image using the imaging conditions and the light-emission conditions which are appropriate to the illumination under low illumination.

The imaging device of the aspect of the present disclosure, in which the light-emission conditions include information on presence or absence of light emission of the auxiliary light, or an amount of light emission of the auxiliary light, and the imaging conditions include information on exposure time of the imaging section, or gain for amplifying a signal of the image which is captured by the imaging section.

According to this configuration, it is possible to capture the first image and the second image with reference to various imaging conditions and light-emission conditions.

The imaging device of the aspect of the present disclosure, in which the condition designating unit designates exposure time in the second imaging condition, so as to be longer than the exposure time in the first imaging condition.

According to this configuration, it is possible to acquire the second image in which the color tone component is enhanced even in the low illumination environment by lengthening the exposure time in the second imaging condition. Thereby, it is possible to generate a vivid composed image. Meanwhile, when the first image is captured according to the first imaging condition, since auxiliary light is emitted, even if the exposure time is short, it is possible to acquire the first image in which the edge component and the gradation component are enhanced in the low illumination environment. Thereby, it is possible to generate a composed image in which the contours are sharp.

The imaging device of the aspect of the present disclosure, in which the condition designating unit designates gain in the second imaging condition, so as to be greater than the gain in the first imaging condition.

According to this configuration, it is possible to acquire the second image in which the color tone component is enhanced even in the low illumination environment by increasing the gain in the second imaging condition. Thereby it is possible to generate a vivid composed image. Meanwhile, when the first image is captured according to the first imaging condition, since auxiliary light is emitted, even if the gain is small, it is possible to acquire the first image in which the edge component and the gradation component are enhanced in the low illumination environment. Thereby it is possible to generate a composed image in which the contours are sharp.

The imaging device of the aspect of the present embodiment, in which the condition designating unit designates such that the longer the distance between the subject and the imaging section, the greater the amount of light emission of the auxiliary light.

According to this configuration, it is possible to acquire the first image in which the edge component and the gradation component are enhanced even in the low illumination environment by increasing the amount of light emission of auxiliary light with respect to a distant subject. Thereby it is possible to generate a composed image in which the contours are sharp.

The imaging device of the aspect of the present embodiment, in which the condition designating unit designates such that the longer the distance between the subject and the imaging section, the longer the exposure time in the imaging conditions.

According to this configuration, it is possible to acquire the second image in which the color tone component is enhanced even in the low illumination environment by lengthening the exposure time in the second imaging condition with respect to the distant subject. Thereby, it is possible to generate a vivid composed image.

The imaging device of the aspect of the present embodiment, in which the condition designating unit designates such that the longer the distance between the subject and the imaging section, the larger the gain in the imaging conditions.

According to this configuration, it is possible to acquire the second image in which the color tone component is enhanced even in the low illumination environment by increasing the gain in the second imaging condition with respect to the distant subject. Thereby, it is possible to generate a vivid composed image.

The imaging device of the aspect of the present embodiment, in which the imaging section captures the second image after the first image is captured.

According to this configuration, for example, in a case where the exposure time in the second imaging condition is lengthened, and generation of the composed image is started at the same timing as the generation of the second image, a time difference of the start of capturing of the image captured after the image which is captured first of the composed image is reduced. Consequently, for example, it is possible to reduce a delayed time for generating the composed image, and improve tracking accuracy of a subject which is moved at high speed.

The imaging device of the aspect of the present embodiment, in which the light emitting unit emits non-visible light.

According to this configuration, it is possible to easily enhance the edge component and the gradation component of the first image.

The imaging device of the aspect of the present embodiment, in which the imaging section includes a filtering section and an imager which receives light via the filtering section, and obtains the image, in the filtering section, transmissivity of light in which a wavelength is included in the first wavelength region and the second wavelength region is higher than the transmissivity of light in which a wavelength is included in another wavelength region, the first wavelength region includes a visible light wavelength region, and the second wavelength region includes a non-visible light wavelength region.

According to this configuration, since the IR-cutoff filter is unnecessary, a mechanical ON/OFF operation of the IR-cutoff filter is unnecessary, and it is possible to increase speed of the imaging operation of the first image and the second image. Accordingly, it is possible to reduce a delayed time for generating the composed image, and improve tracking accuracy of a subject which is moved at high speed.

The imaging device of the aspect of the present embodiment, in which the imaging section captures the first image during the light emission period in a first frame in a case of imaging according to the global shutter method, captures the second image in the non-light-emission period in a second frame which is continuous after the first frame, and the image composer composes the first image and the second image in the second frame.

According to this configuration, since it is possible to capture the first image and the second image in each frame and suppress generation of a low quality image, it is possible to suppress a reduction of frame rate. Accordingly, even in a case where the subject is moved at high speed, it is possible to suppress reduction in image quality of the composed image.

The imaging device of the aspect of the present embodiment, in which in a case of imaging according to the global shutter method, the imaging section captures the first image during the light emission period spanning the first frame and the second frame which is continuous to the first frame, captures the second image during the non-light-emission period spanning a third frame and a fourth frame which is continuous to the third frame, and the image composer composes the first image and the second image in the fourth frame.

According to this configuration, it is possible to adopt the CMOS sensor in the imaging section, and it is possible to reduce costs of the imaging device.

The imaging device of the aspect of the present embodiment, further including an image discarding unit which discards the image which is captured by the imaging section spanning the light-emission period and the non-light-emission period.

According to this configuration, it is possible to suppress the reduction of the image quality of the composed image by changing brightness in the periphery of the subject during imaging and excluding the captured image which is blurred from the composing target.

An imaging system of the present disclosure is an imaging system provided with an imaging device and an information processing device, the imaging device including a condition designating unit which designates, by time division, imaging conditions for capturing an image, and light emission conditions for emitting auxiliary light, an imaging section which captures a first image and a second image including a subject according to the imaging conditions, a light emitting unit which emits auxiliary light with respect to the subject according to the light emission conditions, and a transmission unit which transmits the captured first image and second image, in which the imaging section captures the first image under a first imaging condition during a light-emission period in which the auxiliary light is emitted, and captures the second image under a second imaging condition during a non-light-emission period which is continuous to the light-emission period and the auxiliary light is not emitted, and the information processing device is provided with a receiving unit which receives the first image and the second image from the imaging device, and an image composer which composes the first image and the second image.

According to this configuration, for example, it is possible to extract the edge component and the gradation component from the first image, it is possible to extract the color tone component from the second image, and it is possible to apply the color tone in an image which includes the subject based on the extracted component. Thereby, even if the subject is captured in the low illumination environment, it is possible to obtain a composed image with high color reproducibility. In addition, since a large-scale apparatus is not necessary as an imaging device, it is possible to reduce costs which are necessary for the device, and simplify adjustment and maintenance of the device. Accordingly, it is possible to easily improve quality of the captured image in the low illumination environment.

An imaging method of an aspect of the present disclosure is an imaging method in the imaging device, including designating, by time division, imaging conditions for capturing an image including a subject, and light emission conditions for emitting auxiliary light with respect to the subject, capturing a first image under a first imaging condition during a light emission period in which the auxiliary light is emitted, capturing a second image which is captured under a second imaging condition during a non-light-emission period which is continuous to the light emission period and the auxiliary light is not emitted, and composing the first image and the second image.

According to this method, for example, it is possible to extract the edge component and the gradation component from the first image, it is possible to extract the color tone component from the second image, and it is possible to apply the color tone in an image which includes a subject based on the extracted component. Thereby, even if the subject is captured in the low illumination environment, it is possible to obtain a composed image with high color reproducibility. In addition, since a large-scale apparatus is not necessary as an imaging device, it is possible to reduce costs which are necessary for the device, and simplify adjustment and maintenance of the device. Accordingly, it is possible to easily improve quality of the captured image in the low illumination environment.

What is claimed is:

1. An imaging device comprising:
   a condition designating unit which designates, by time division, imaging conditions for capturing an image, and light emission conditions for emitting auxiliary light;
   an imaging section which captures an image including a subject according to the imaging conditions;
   a light emitting unit which emits the auxiliary light with respect to the subject according to the light emission conditions; and
   an image composer which composes a first image that is captured under a first imaging condition during a light emission period in which the auxiliary light is emitted and a second image which is captured under a second imaging condition during a non-light-emission period which is continuous to the light emission period and in which the auxiliary light is not emitted,
   wherein in a case of imaging according to a rolling shutter method, the imaging section captures the first image during the light emission period spanning a first frame and a second frame which is continuous to the first frame, and captures the second image during the non-light-emission period spanning a third frame and a fourth frame which is continuous to the third frame, and
   the image composer composes the first image and the second image in the fourth frame.

2. The imaging device according to claim 1, further comprising:
   an image discarding unit which discards the image which is captured by the imaging section in a frame including the light-emission period and the non-light-emission period.

3. An imaging system comprising:
an imaging device; and
an information processing device,
wherein the imaging device
   designates, by time division, imaging conditions for capturing an image, and light emission conditions for emitting auxiliary light,
   captures a first image and a second image including a subject according to the imaging conditions,
   emits the auxiliary light with respect to the subject according to the light emission conditions, and
   transmits the captured first image and second image,
wherein the first image is captured under a first imaging condition during a light emission period in which the auxiliary light is emitted, and the second image is captured under a second imaging condition during a non-light-emission period which is continuous to the light emission period and in which the auxiliary light is not emitted, and
wherein the information processing device
   receives the first image and the second image from the imaging device, and
   composes the first image and the second image,
wherein, in a case of imaging according to a rolling shutter method, the first image is captured during the light emission period spanning a first frame and a second frame which is continuous to the first frame, and the second image is captured during the non-light-emission period spanning a third frame and a fourth frame which is continuous to the third frame, and
the first image and the second image are composed in the fourth frame.

4. An imaging method in the imaging device, comprising:
designating, by time division, imaging conditions for capturing an image including a subject, and light emission conditions for emitting auxiliary light with respect to the subject;
capturing a first image under a first imaging condition during a light emission period in which the auxiliary light is emitted;
capturing a second image under a second imaging condition during a non-light-emission period which is continuous to the light emission period and in which the auxiliary light is not emitted; and
composing the first image and the second image
wherein, in a case of imaging according to a rolling shutter method, the first image is captured during the light emission period spanning a first frame and a second frame which is continuous to the first frame, and the second image is captured during the non-light-emission period spanning a third frame and a fourth frame which is continuous to the third frame, and
the composing composes the first image and the second image in the fourth frame.

* * * * *